C. H. GRANT.
HORSESHOE.
APPLICATION FILED AUG. 3, 1918.
1,294,896.
Patented Feb. 18, 1919.
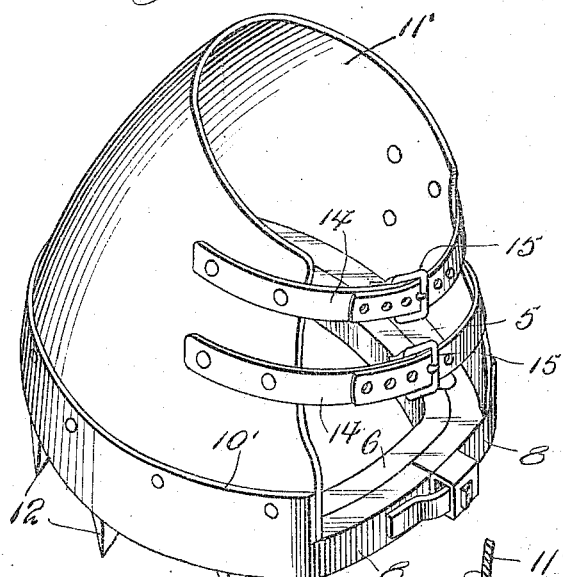
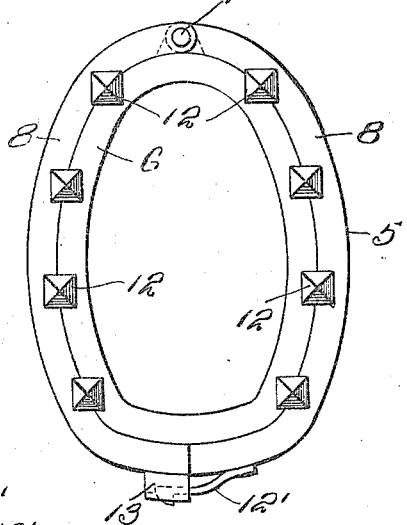
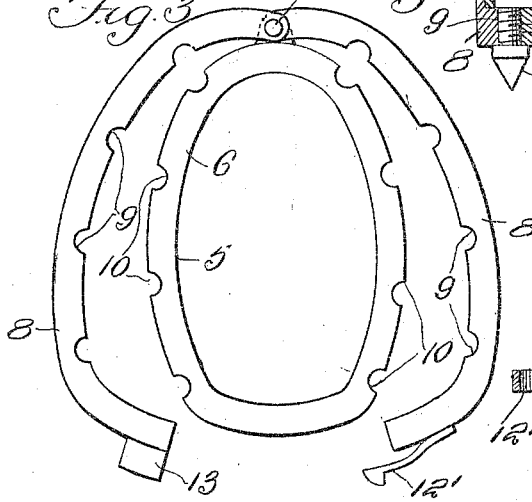
Witnesses
J. L. Wright
Inventor
Charles H. Grant
By Victor J. Evans
Attorney

UNITED STATES PATENT OFFICE.

CHARLES H. GRANT, OF FREEPORT, NEW YORK.

HORSESHOE.

1,294,896.

Specification of Letters Patent.   Patented Feb. 18, 1919.

Application filed August 3, 1918.   Serial No. 248,115.

*To all whom it may concern:*

Be it known that I, CHARLES H. GRANT, a citizen of the United States, residing at Freeport, in the county of Nassau and State of New York, have invented new and useful Improvements in Horseshoes, of which the following is a specification.

This invention relates to improvements in horseshoes, and has for its object to provide a device of this character which may be easily, quickly and securely attached to the hoof of an animal without necessitating the nailing of the shoe to the said hoof, and as a consequence permit of the shoe being removed when desired.

A further object of the invention is to produce a detachable horseshoe having means associated therewith whereby calks may be readily attached thereto or removed therefrom as desired.

Other objects and advantages will present themselves as the nature of the invention is better understood, reference being had to the accompanying drawing, in which:

Figure 1 is a perspective view of the improvement;

Fig. 2 is a bottom plan view of the same;

Fig. 3 is a similar view but showing the section in spread condition, as when the calks are to be removed; and Fig. 4 is an approximately central longitudinal sectional view through the improvement.

The shoe is broadly indicated by the numeral 5 and comprises a substantially elliptical base 6 to the outer edge of which is hingedly connected, as at 7, a pair of plates 8, the inner periphery of which corresponding to the outer periphery of the base member 6. The members 8 have their inner peripheries provided with substantially semi-cylindrical notches 9 which are threaded and which are designed to register with similar threaded notches 10 in the outer periphery of the base 6. The threads of the respective notches of course aline and are adapted to receive therebetween the threaded shanks 11 of calk members 12.

The members 8, upon their outer edges, are provided with inwardly extending upwardly disposed metallic flanges 10', and upon the inner edges of these flanges are secured the sections comprising the boot 11'. The boot 11' may be constructed in sections, and of course, conforms to the shape of the hoof of the animal upon which the device is to be attached. The sections 8, at their free ends are provided with connecting means, one of the sections having a central buckle or snap hook 12' designed to engage in an eye 13 upon the other section 8, and if desired either the eye or the snap-hook may be secured to one of the sections 8 by yieldable means, such for instance as a spring, The boot 11', at the outer or free ends thereof, is provided with securing means such, for instance, as straps 14—14 provided with buckles 15—15 on one of the straps and designed to engage with the other section of the strap.

It will be noted that by swinging the sections to their open position the calks may be readily removed without necessitating the entire removal of the shoe from the hoof of the animal, and in a like manner the said calks may be applied. However, in practice, I have found that the calks can be readily screwed in the threaded openings when the sections are assembled and the device is on the hoof of the animal, so that any desired number of calks may be thus applied.

It is believed that the simplicity of the construction and the advantages thereof will be apparent without further detailed description.

Having thus described the invention, what is claimed as new, is:—

In a detachable horseshoe, a substantially elliptical body having its edges provided with spaced notches which are threaded, outer sections hingedly secured to one of the ends of the body and having their inner peripheries corresponding in shape to the outer periphery of the body, the said inner peripheries having threaded notches designed to register with the threaded notches of the body and to receive threaded shanks of calks therebetween, a flange formed on the outer periphery of the outer sections, a boot secured to said flange, means at the free ends of said outer sections for connecting the same, and means for connecting the free ends of the boot.

In testimony whereof I affix my signature.

CHARLES H. GRANT.

Copies of this patent may be obtained for five cents each, by addressing the "Commissioner of Patents, Washington, D. C."